Jan. 11, 1955  H. LYONS ET AL  2,699,503
ATOMIC CLOCK
Filed April 30, 1949  7 Sheets-Sheet 1

INVENTOR
Harold Lyons
Benjamin F. Husten
BY Arthur Vinograd
ATTORNEY

Jan. 11, 1955   H. LYONS ET AL   2,699,503
ATOMIC CLOCK
Filed April 30, 1949   7 Sheets-Sheet 2

INVENTOR
Harold Lyons
Benjamin F. Husten
BY
Arthur Vinograd
ATTORNEY

Jan. 11, 1955

H. LYONS ET AL 2,699,503

ATOMIC CLOCK

Filed April 30, 1949

INVENTOR
Harold Lyons
Benjamin F. Husten

BY Arthur Vinograd

ATTORNEY

INVENTOR
Harold Lyons
Benjamin F. Husten
BY
Arthur Vinograd
ATTORNEY

Jan. 11, 1955 — H. LYONS ET AL — 2,699,503
ATOMIC CLOCK
Filed April 30, 1949 — 7 Sheets-Sheet 5

INVENTOR
Harold Lyons
Benjamin F. Husten
BY
ATTORNEY

HAROLD LYONS and
BENJAMIN HUSTEN
INVENTORS

Jan. 11, 1955  H. LYONS ET AL  2,699,503
ATOMIC CLOCK
Filed April 30, 1949  7 Sheets-Sheet 7

INVENTORS
HAROLD LYONS AND
BENJAMIN HUSTEN
BY
Ray C. Hackley
ATTORNEY

United States Patent Office

2,699,503
Patented Jan. 11, 1955

2,699,503

ATOMIC CLOCK

Harold Lyons, Washington, D. C., and
Benjamin F. Husten, Arlington, Va.

Application April 30, 1949, Serial No. 90,761

8 Claims. (Cl. 250—36)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to a clock and more particularly to a clock the rate of which is kept constant by the use of invariant vibrations of molecules or atoms.

The present primary time and frequency standards are based on astronomical determinations of the period of rotation of the earth. The earth is continually slowing down due to the forces of tidal friction in shallow seas. In addition, rather sudden fluctuations in the period of rotation take place from time to time for unknown reasons. These two causes are responsible for changes in mean solar time and in the frequency of any periodic or vibrating systems measured in terms of such time standards. The magnitudes of these changes are shown in the following table, taken from de Sitter, in which excellent agreement is obtained between the observed motions of the sun, moon, and planets and the calculated positions of these bodies provided that the earth's rotation is assumed to have changed:

*Increase in the length of the day due to tidal friction*

| Era A. D. | Increase per Century |
|---|---|
| 1640–1745 | +2.4 Milliseconds. |
| 1745–1870 | +1.3 Milliseconds. |
| Since 1870 | +3.7 Milliseconds. |

*Fluctuations in the length of the day*

[Change in the length of the day from its average value.]

| Era A. D. | Milliseconds | Parts in 10 $^8$ |
|---|---|---|
| 1664–1755 | +1.34 | +1.55 |
| 1755–1786 | +0.89 | +1.03 |
| 1786–1864 | −0.91 | −1.05 |
| 1864–1876 | −3.57 | −4.13 |
| 1876–1897 | −1.86 | −2.16 |
| 1897–1918 | +1.55 | +1.77 |
| After 1918 | −1.86 | −2.16 |

The observed fluctuations of approximately one part in 25 million make the day unsuited as a primary standard when accuracies greater than this are needed. Instrumental errors in the determination of star transits and atmospheric refraction set further limits on the accuracy with which the day can be determined unless intervals of many days can be measured. This procedure makes time observations inaccessible at frequent and arbitrary intervals, as is often desired, and presents another difficulty in the use of astronomical time standards. The observed variations in the day are no longer negligible in view of the demands of modern applications. It is therefore desirable to find a new clock which would be independent of the rotation of the earth and of a constant, invariable nature.

Another factor in the use of the present frequency and time standards which limits their applicability is the existence of radio transmission errors. The standard frequency broadcasts, which provide world-wide coverage for frequency and time services, rely on ionospheric propagation for long distance transmissions. The vertical motion of the ionosphere, plus other unexplained factors, introduces a Doppler shift in frequency of the received signal. This varies cyclically as the diurnal cycle of ionosphere changes takes place. In standard frequency broadcasts from the United States to England deviations of one part in 4 million have been recorded, indicating that frequency calibrations against the received standard broadcast cannot be taken on an instantaneous basis by means of heterodyne methods when accuracies greater than this are required. If measurements are limited to certain periods of the day or other precautions and techniques used, improvements in accuracy are possible. However, the basic utility of the standard frequency broadcast, as an ever present standard suitable for continuous frequency measurements of the highest precision, is impaired.

Plans have been formulated to provide standard frequency and time broadcasts from many stations strategically located so as to render good service over the world. Such services could possibly be greatly improved or simplified, in view of the transmission errors, if portable or semi-portable, absolute and invariant frequency standards and clocks were available. This again points to the need for new methods.

In looking for new standards, specifications can be laid down for the ideal to be sought for. Any periodic phenomenon can be used as a frequency standard. Such phenomena are provided by vibrating or oscillating systems. If in addition to an oscillator, means are provided for counting or totalizing the number of oscillations, time intervals can be measured and the device can be called a clock. An oscillator alone can be the timing element or regulator of a clock but is not by itself a clock. This distinction is important because some vibrating systems run too fast to be able to count the vibrations even by presently available techniques.

It is therefore necessary to look for a vibrating system in a frequency range accessible to counting methods. In addition, it is necessary that the vibration rate be invariant, independent of age or external parameters, precisely reproducible if the oscillator is destroyed or built in quantity, and capable of measurement with great accuracy. Most oscillators determine a range of frequency, indicated by their Q values, rather than a single frequency. The resonance curve of the oscillator should be as narrow and sharp as possible in order to make possible an accurate frequency standard. In addition, the vibration rate should not be too low in order that time intervals between counts should not be too long. Otherwise, time measurements are not available or easily accessible when needed at arbitrary time intervals. Thus the day is so long, that clocks other than the earth are necessary to give time readings between star transits. Finally, it would be desirable to have a time unit of a basic nature, related in principle to the fundamental constants of nature. The mean solar day and the year, are arbitrary time units analogous to the meter bar used as a length standard. A standard derived from the field of atomic physics would have a basic character related to the structure of matter and therefore allow more accurate tests of physical theory.

The above specifications immediately rule out all macroscopic standards consisting physically of aggregates of matter. All aggregates such as pendulums, tuning forks and quartz crystals are sensitive to external parameters such as temperature, pressure and so on. In addition, such an aggregate is never exactly reproducible. Even quartz crystals, although exemplary in stable physical and chemical qualities, constantly drift in frequency with age both inherently and due to changes in mounting. The quartz crystal clock has always been a secondary standard only, in the sense of lacking ultimate stability and requiring calibration in terms of the mean solar day.

Use of atoms or molecules as vibrating systems is therefore made in the invention described herein. Such systems meet most all of the specifications given above. However, isolated individual atoms or molecules in a field-free space cannot in practice fill the technological needs encountered in making a clock. It is so far always necessary to have a fairly large number of atoms or molecules as in a beam or an absorption cell containing a gas. Even the effect of the earth's gravitational field on the frequency is a factor, very small but not zero. In most cases the effect of undesirable, external electric or magnetic fields on the frequency of the atomic systems can be made negligible. Vibrations or oscillations which materially depend on such fields should not be selected for use in a time standard. An example is the case of nuclear induction.

Vibrations of atoms or molecules, or what are properly termed spectrum lines originating in transitions of such atomic systems between energy levels, cannot be used in the infra-red, visible or higher regions of the spectrum. It is recognized that sharp spectral lines in these regions indicate that atoms or molecules could, in principle, be used as frequency standards. In practice only wavelengths could be measured, and the frequencies have been too high to make a clock; that is the oscillations could not be counted or integrated and therefore time intervals could not be measured in this way. Accordingly, the wavelengths of red cadmium light, long ago, and more recently, of mercury were used as length standards but the analogous application to time standards was not possible. It is to be emphasized again that an atom by itself can be used to determine a unit of time, this being equal to its period of vibration, and is thus a time standard. Time intervals cannot be measured, however, until a totalizing mechanism is added. In this sense an atom or molecule or other oscillator is not a clock but a time standard.

In order to use an atom or molecule as a time standard in a clock, frequencies in the radio region of the spectrum would be needed to make possible the counting of the oscillations. In recent years spectrum lines have been found in the radio and microwave ranges by atomic beam and absorption methods. In both cases, greatest accuracy is achieved at the highest frequencies, but this makes the counting problem more difficult.

The needs of modern technology for precision time and frequency standards lead to many varied applications in which spectroscopic standards could play a part.

Some of the basic needs have to do with astronomical measurements, precise surveying, as for example the work of the coast and geodetic survey and precision military mapping, long-range navigation systems for aircraft and other transportation services, the possibility of precise time measurements in connection with extra-terrestrial flight in rockets, the development of atomic systems or components which depend on spectrum lines as radio elements in the ultra-short microwave region (millimeter bands) where regular microwave technique is impracticable, as for example the precise measurement of absorption lines to be used as radio filters, and finally the need for precision in basic research in the field of microwave spectroscopy and molecular structure.

In astronomical measurements, the variation in time standards due to variations in the rate of rotation of the earth on its axis, causes errors in the location of heavenly bodies and in studies of the orbits or motions of such bodies. If, for example, an old nautical almanac is consulted as to where to point your telescope at a certain time to see a certain body, the answer will be wrong due to changes in the time units. This has been the way in which astronomers first discovered that the earth's time-keeping was not constant as already explained. Such measurements are not very accurate nor do they allow rapid determination of the fact that the rate of rotation has changed.

The atomic clock should offer the possibility of an invariant master clock against which the variation in timekeeping of the earth could be measured. Such variations are already large enough to necessitate some means of improvement. An absorption cell used on such a clock could, for many purposes, take the place of a whole astronomical observatory. In fact, the results could be better in many ways because no clouds could prevent the taking of an observation as with telescopes. The comparison of the clock against the absorption cell is independent of the weather. In addition corrections to the observatory clocks take a long time to determine. These corrections are made from star transit observations and after a considerable interval, are applied to the readings of an electric-pendulum and to quartz crystal clocks to bring them into agreement with the primary time standard. This process is not only long delayed, but also complicated, non-automatic and subject to errors. In contrast, the absorption line, thought of as a form of atomic observatory used to control a clock, automatically, instantly and continuously controls the rate of the clock without any human intervention.

At the present time, the National Bureau of Standards radio station, WWV, broadcasts standard frequency and time signals on several transmitter frequencies to all the world. The Navy Department also uses quartz-crystal clocks to broadcast time signals for navigational purposes from various stations so as to get good coverage over the oceans wherever a ship may be. Such quartz-crystal clocks have to be constantly adjusted, because they drift, to keep them in agreement with the basic astronomical time signals. Quartz-crystal clocks of this type could be automatically kept constant by means of the use of absorption lines. In addition, the use of the standard frequency broadcasts for keeping all kinds of radio, radar and electronic equipment properly tuned all over the world is of the utmost importance. International transportation and communications require this, so that for example an airplane with radio navigational equipment will be on the right frequency wherever it happens to be in the world or whichever airport it happens to be using. Also keeping on frequency is necessary to utilize the limited space in the radio spectrum efficiently. However, the use of long-distance standard frequency broadcasts is complicated by a large reduction in accuracy due to ionospheric effects discussed at the beginning of this disclosure. This problem could be avoided by having equipment checked against an absorption line wherever it was located in the world with the certainty of obtaining a precision calibration against an absolute standard and without depending on a standard frequency broadcast which might be in error due to propagation effects.

One advantage of the rotating earth as a time-keeper, is that it never stops rotating or breaks down. In contrast any man-made clock must not break down but must be kept running forever if it is to keep track of time from some arbitrarily chosen instant used as a starting point. This difficulty is met at present, with quartz-crystal clocks, by using a large number of identical clocks constantly intercompared so that breakdown of one does not mean a loss of time-keeping records. This procedure could also be used with atomic clocks. Of course, for use as a frequency standard and for defining a standard of timeintervals it is not necessary to keep the clock running continuously so that this difficulty is not met for these extremely important types of use. The atomic clock does, however, offer the possibility of improvements in astronomical time standards in a way which is not possible with electric pendulum or quartz-crystal clocks due to their instabilities. If an atomic clock were run continuously over a period of a year, the use of the year rather than the day as a unit of time could be investigated. The time it takes the earth to revolve once in its orbit around the sun is a year and this unit is, of course, completely independent of the time it takes the earth to rotate once on its axis, the day. This independence causes all the trouble with the calendar, necessitating leap years in order that the seasons will always come at the same time during the year. The year has not been used as the basic time unit in the past because there was no clock capable of running constantly enough to keep track of the time between yearly observations. The quartz-crystal clock drifts too much over a period of a year. This difficulty might be overcome by use of the atomic clock since it is invariant. It could then be determined by measurements whether the mean, sidereal year was more constant than the mean, solar day as some astronomers believe may be the case. A small instrumental error in determining the length of the year would, of course, not be very consequential, as compared to the same error in determining the length of the day because of the much greater length of the year as compared to the day. Such errors are of course inevitable in the telescopes or other equipment used, and in the fact that atmospheric refraction, which causes the twinkling of the stars, sets a limit to the accuracy with which a star transit can be determined. However, although the year would be useful as a time unit for some uses, it would still be of an arbitrary character as compared to an atomic time standard and therefore less desirable as a basic physical unit.

With present time standards the measured frequencies of spectra of the elements and of the light from the stars would appear to change since even though it is the wavelength of such spectra which is measured, the wavelength is converted into frequencies by utilizing the value of the velocity of the wave (the velocity of light) which in turn depends numerically on the time units used. For just such uses of time standards, it would be useful to change over to atomic time since such standards would then give invariant answers in the measurements used in physics, chemistry and engineering. Even in the case of the change of civil time from mean solar to atomic time, the difficulties with the calendar would be no greater than at present and could be dealt with in various ways but would require continuous running of man-made atomic clocks.

It is well to note that in cases of extreme precision in time measurements, the effect of gravitation must also be considered. If a man in a rocket compares his frequencies to the frequency of similar equipment on the ground he will find a difference because the signal will have to use up energy against the force of the earth's gravitational field to reach the rocket. A quantum of radiation has its energy decreased in this way and since its quantum energy is proportional to its frequency this means that its frequency must be reduced. This result also follows from the theory of relativity and is given as an explanation of the residual, gravitational red-shift in the light from the stars, after the Doppler shift due to the recession of the star from us is subtracted off. The frequency of a radio signal leaving the earth will appear to differ by about one part in a billion as measured by observers in rockets. Such differences, if they could be measured, would give a test of the theory of relativity and would only be possible if atomic clocks having the necessary accuracy were developed. Other relativity tests utilizing such clocks can also be devised. This also means that radio equipment tuned on the earth would have to be retuned after leaving the earth, provided of course that such narrow frequency bands were being used that such retuning would be necessary. Such a need although unlikely could be visualized in the millimeter wavelength bands where spectrum lines would be used for components of a radio system. Such short wavelengths could be utilized in interplanetary travel because there would be no atmosphere to absorb the radiation as occurs here on earth. Very narrow beams of radiation could be transmitted in the millimeter bands without using enormous antennas because of the extreme shortness of the wavelengths involved. It is also foreseeable that extremely accurate clocks will be needed for extra-terrestrial navigational purposes, since the distances involved are so great. To determine position with any great accuracy when such large distances are dealt with would require navigational instruments having much greater accuracy than now available. In fact geodetic work on the earth could already use clocks better than those now available.

It is desirable to get frequency standards on an atomic basis also because the chemical analysis of heavy molecules by means of microwave spectroscopy is now possible. More and more chemicals will be capable of analysis as technique is pushed to higher and higher frequencies in the microwave region. Already about 600 microwave spectrum lines have been found. Atomic chemical analyses have been long made in the visible and utlra-violet regions of the spectrum. However, chemists usually want to make an analysis of the molecular constitution. Microwave spectroscopy does give the molecular constitution. Organic chemistry is most in need of new tools and constitutes an application of the most far-reaching importance. The bigger and heavier the molecule is, the more difficult is chemical analysis with ordinary methods. However, the heavy molecules usually have spectrum lines down in the microwave region because a heavy molecule rotates at a slower rate than a light one so that the heavier the molecule the better, within certain complicated limitations. Such large molecules are principally involved in the field of high polymers and organic chemistry, in plastics, rubber, textiles, oil, foods, drugs and biological chemicals such as vitamins. Infra-red spectrometers have been used to some extent for this purpose. However, a microwave spectroscope has resolution up to 100,000 times greater than an infra-red spectroscope and can easily detect the components due to individual isotopes. The spectrum due to rotation lines is also of a very simple type, easy to work with. Isotopic identification is not possible by ordinary chemical means since chemistry deals essentially only with the outer parts of an atom or molecule and not the nucleus. With the advent of isotopes now available from the Atomic Energy Commission and their widespread application in industry and medicine, it is more important than ever to have quick, accurate instruments for measurements of the kind and quantity of isotopes present in a sample. The microwave spectrometer can make measurements on the most minute samples and can be built to do this quickly and accurately with an automatic, all-electronic instrument. Precision frequency standards for such identification and measurement of molecular constituents, as provided by spectrum lines having the same basic origin as the spectrum lines of the sample being measured, would help eliminate the intermediate step of comparing such lines to a separate frequency standard based on the rotation of the earth. The frequencies of many of the lines in ammonia have been measured.

One of the most important applications of quartz crystals is to the frequency-control of transmitters and filters used in all radio, military or civilian. All broadcast stations are kept tuned to the right frequency by means of quartz crystals within the legal requirements laid down by the Federal Communications Commission. If these transmitters varied in frequency, radio and television sets would constantly have to be retuned and in addition much interference between adjacent channel transmitters would result. The telephone system operates many carrier telephone circuits in which large numbers of simultaneous messages are transmitted over the same cable. These individual messages are separated out by means of crystal filters. It is clear that similar needs are most urgent at the higher frequencies inaccessible to crystal oscillators or filters. Here spectrum line or atomic oscillators, such as already described and lines used as filters, would give the necessary frequency control and stability. The spectrum lines would mark out invariant frequency channels on a permanent basis making the tuning-in of a given channel as automatic, in principle, as the dialing of a telephone number. A filter for communication or other uses would consist simply of a cell filled with absorbing gas and could have many frequencies which it would not pass. A band-pass rather than a band-stop filter can also be made by means of magic T's. Such filters could be tuned by entirely electric means using the well-known Stark effect in which an applied electric field can force a molecule to change its frequency. Such fields would not be troublesome in an atomic clock since they can be completely shielded from an absorbing gas by using a metal absorption cell as in the present clock. Magnetic fields can also shift the frequency somewhat but weak fields such as the earth's magnetic field have practically no effect.

Other objects and advantages will become apparent to those skilled in the art from the following specification taken in connection with the accompanying drawing in which Fig. 1 is a simplified block diagram of a device embodying the principles of this invention.

Figure 1:
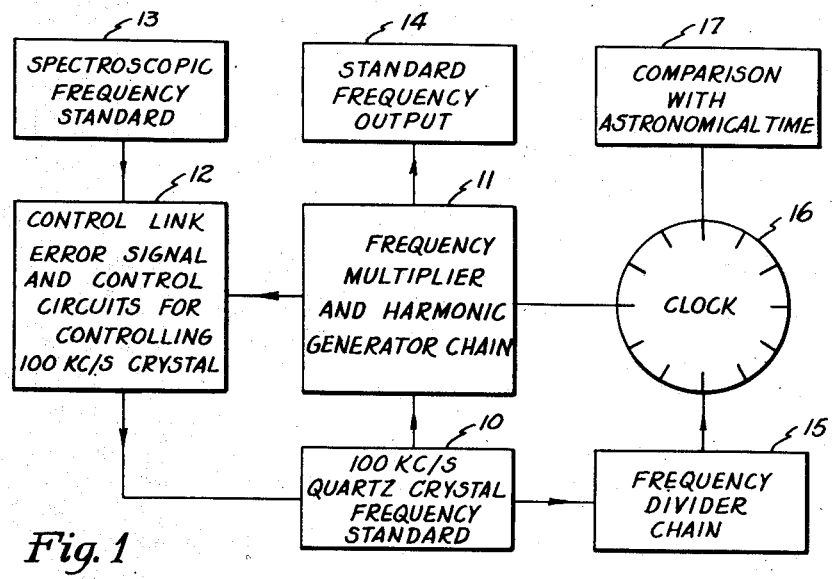

In the simplified showing in Fig. 1 of a clock built in accordance with this invention there is provided a high-stability-100 kilocycle oscillator 10, the frequency of which is controlled by a quartz crystal. The 100 kilocycle frequency from oscillator 10 is applied to frequency multiplier 11 where it is multiplied and applied to control link 12. Control link 12 compares the multiplied frequency from component 11 with the spectroscopic frequency standard 13 and produces an error signal which is applied back to adjust the 100 kilocycle quartz crystal oscillator 10. The quartz crystal oscillator 10 is thus held to a high degree of constancy. One great advantage of this particular clock circuit is that it utilizes the good short-time stability of the quartz crystal oscillator making it unnecessary for the control link 12 to apply control signals to the oscillator 10 at a rapid rate. The circuit as described uses the excellent short-time stability of the quartz crystal and the invariant nature of a spectroscopic frequency standard to obtain a clock with an extremely constant rate independent of temperature and gravitational effects.

The 100 kilocycle output from oscillator 10 is divided by the frequency divider circuits 15 and applied to clock 16 which can be compared to astronomical time in component 17. The multiplied frequencies produced in multiplier 11 may be applied to the output component 14 where they may be further multiplied, divided, and/or mixed to produce various frequency standards.

Figure 2:
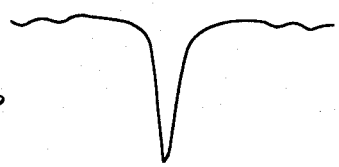
Fig. 2 is a curve showing the absorption characteristic of ammonia.

The spectroscopic frequency standard 13 may be any invariant means having a sharp frequency dependent reaction to radio frequency vibrations. Ammonia gas is a particular example of such a standard since it has several sharp absorption lines in the radio frequency spectrum. In Fig. 2 is seen an absorption line of ammonia gas at a frequency of approximately 23,870.1 megacycles and at a gas pressure of about 5 microns of mercury.

Figure 3:
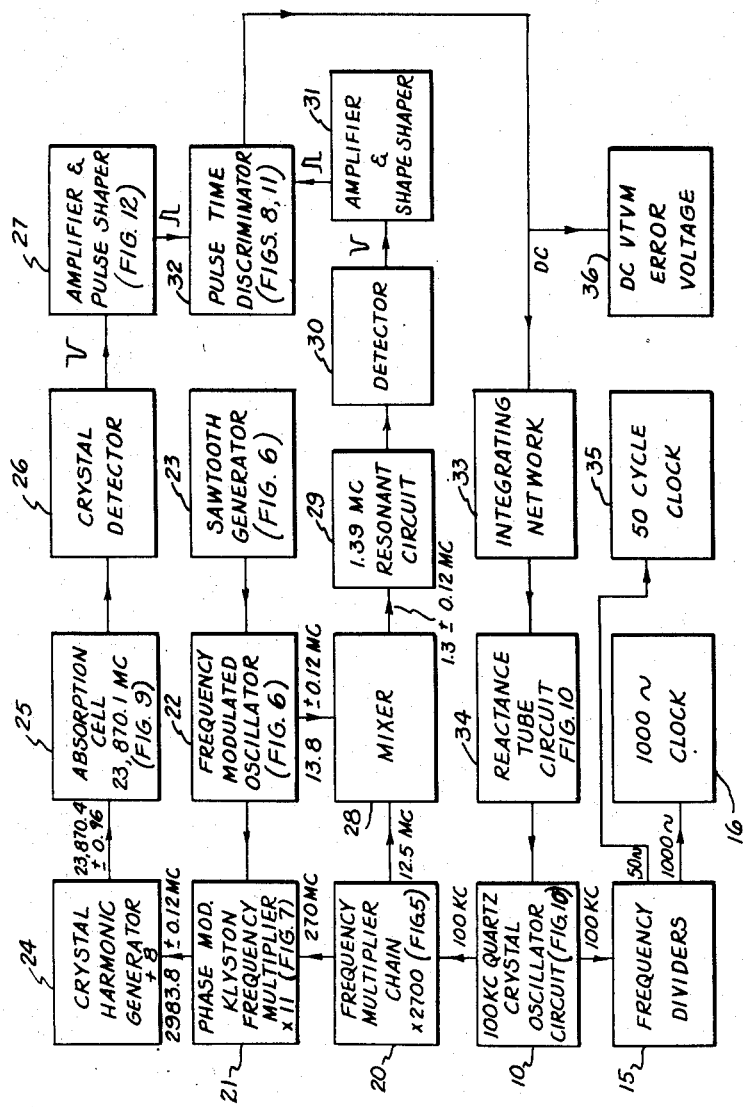
Fig. 3 is a block diagram of a practical clock constructed on the principle illustrated in Fig. 1.

In Fig. 3 is shown a block diagram of a practical clock constructed on the principle illustrated in Fig. 1 using ammonia gas as the spectroscopic frequency standard. The crystal oscillator 10 provides a 100 kilocycle frequency output which is multiplied to 270 megacycles in the multiplying chain 20. The 270 megacycle output of component 20 is further multiplied in frequency up to 2970 megacycles by means of a klystron frequency multiplying circuit 21 which is also phase modulated by a frequency modulated oscillator 22 generating an output frequency of $13.8 \pm .12$ megacycles. This causes the klystron circuit 21 to produce a frequency modulated output of $2983.8 \pm .12$ megacycles. Frequency modulated oscillator 22 is modulated by a low frequency generator 23 which produces an output voltage of the sawtooth form.

The frequency modulated output of component 21 is applied to a silicon crystal rectifier 24. This silicon crystal rectifier 24 generates harmonics of the $2983.8 \pm .12$ megacycle input frequency. The eighth harmonic energy $23,870.4 \pm .96$ megacycles propagates through the absorption cell 25 to the silicon crystal rectifier 26 which acts as a detector. As the instantaneous frequency of the radio frequency energy passes through the absorption line of the ammonia gas, the amount of energy reaching the detector crystal 26 decreases because of the absorption of energy by the ammonia molecule at this particular frequency. This decrease of the energy causes a negative pulse to appear at the output of the detector crystal. This pulse is amplified and shaped in component 27 and passed into a pulse time discriminator 32.

A second comparison pulse is generated by combining the $13.8 \pm 0.12$ megacycles output of the frequency modulated oscillator 22 with a 12.5 megacycle output of the frequency multiplier chain 20 in the mixer component 28 so as to obtain the difference frequency of $1.3 \pm 0.12$ megacycles at the output of the mixer 28. The $1.3 \pm 0.12$ megacycles output from the mixer 28 is then passed through a resonant circuit 29 which is tuned to 1.39 megacycles. As the instantaneous frequency passes through the resonance frequency of the tuned circuit 29 the energy reaching the detector 30 is increased causing a pulse to be formed at the output of the detector 30. This pulse is amplified and shaped in component 31 and passed into the pulse time discriminator 32 together with the pulse from component 27.

The time interval between the two pulses, that generated by the ammonia molecule and that generated by the resonant circuit 29, is a measure of the degree to which the output of the frequency multiplying chain is in tune to the vibrations of the ammonia molecule. The two pulses can therefore be made to control a discriminator which will give zero output when the time interval is right and will give an output voltage with a magnitude and polarity depending upon the degree and direction of the change of the time interval from the zero position. If the quartz crystal oscillator 10 drifts in frequency, the pulse generated by the ammonia molecule moves with respect to the pulse generated by component 29 and the pulse time discriminator 32 generates an output control voltage with a magnitude and polarity that depend upon the magnitude and direction of the drift in the quartz crystal oscillator 10.

The control voltage thus generated in component 32 is fed through an integrating network 33 to the reactance tube circuit 34 which controls the quartz crystal oscillator 10 and forces it to oscillate at the correct frequency to tune to the absorption line of the ammonia gas. The quartz crystal oscillator is thus locked to the vibrations of the ammonia molecule and these vibrations determine the oscillator frequency. Because of the inherent short-time stability of the quartz crystal oscillator, the control voltage from component 32 does not have to be applied to the oscillator circuit at a rapid rate and the integrating circuit 33 can be used to filter out all short time fluctuations in the output voltage from the pulse time discriminator 32. Thus, all fluctuations in the control signal are smoothed out except for the slow steady changes generated when oscillator 10 tries to drift in frequency.

The 100 kilocycle output from the controlled quartz crystal oscillator 10 is divided in frequency dividers 15 and used to drive a special 1000 cycle synchronous motor clock 16 which is designed for exact adjustment and comparison with astronomical time to within $\frac{5}{1000}$ of a second. A 50 cycle output from frequency dividers 15 is used to drive an ordinary synchronous clock 35.

A vacuum tube voltmeter 36 is provided for monitoring the control voltage applied to the quartz crystal oscillator 10 so manual adjustments can be made on the oscillator if the magnitude of the control voltage gets very large, thus reducing the load on the control circuits.

Figure 4:
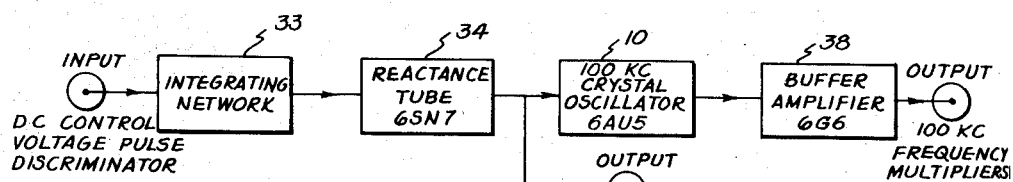
Fig. 4 is a more detailed block diagram of the crystal oscillator and reactance tube shown in Fig. 3.

Fig. 4 shows more in detail the reactance-tube crystal oscillator circuit. An integrating network 33 is interposed between the control voltage from the pulse time discriminator 32 and the input to the reactance tube circuit to remove all fluctuations in the control voltage except those due to steady changes in frequency of the quartz crystal oscillator. The reactance tube circuit 34 is connected to the oscillator circuit 10 so changes in voltage on the reactance tube input will result in changes in the output frequency of the oscillator 10. A buffer amplifier 38 is interposed between the crystal oscillator and the frequency multipliers and frequency dividers to prevent circuits external to the oscillator from affecting the frequency of oscillation.

Figure 5:
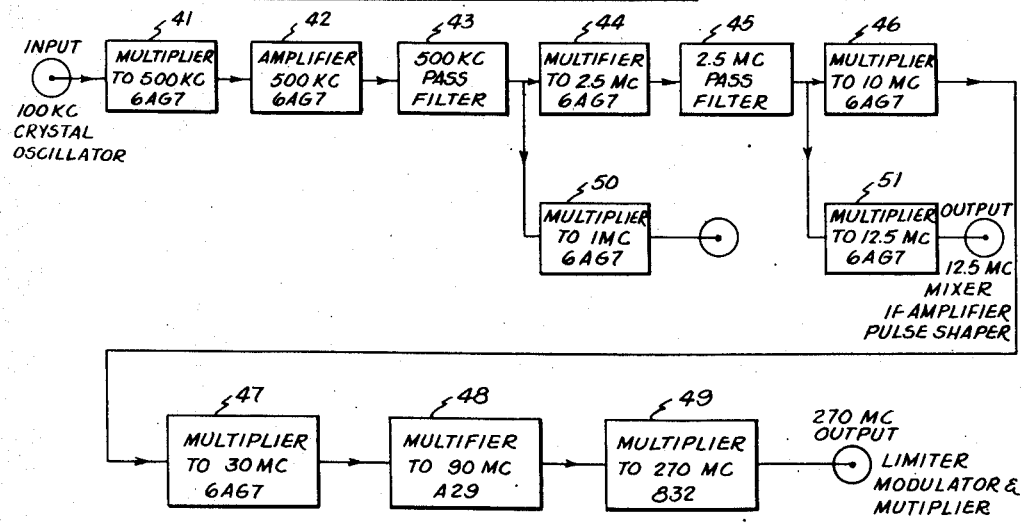
Fig. 5 is a more detailed block diagram of the multiplier chain in Fig. 3.

Fig. 5 shows more in detail the frequency multiplier chain 20. The 100 kilocycles from the quartz crystal oscillator 10 is multiplied to 500 kilocycles in component 41, and the 500 kilocycle energy thus produced is amplified in component 42. A 500 kilocycle pass filter 43 is interposed between components 42 and 44 to remove all frequencies except the 500 kilocycles from the output of component 42. The 500 kilocycles is then multiplied to 2.5 megacycles in component 44. Here again, a pass filter 45 is interposed to remove all frequencies except 2.5 megacycles. The 2.5 megacycle frequency is then multiplied to 10 megacycles in component 46 and then successively to 30, 90, and 270 megacycles in components 47, 48, and 49, respectively. Additional standard frequency outputs are provided at 1 megacycle and 12.5 megacycles by frequency multipliers 50 and 51, respectively.

Figure 6:
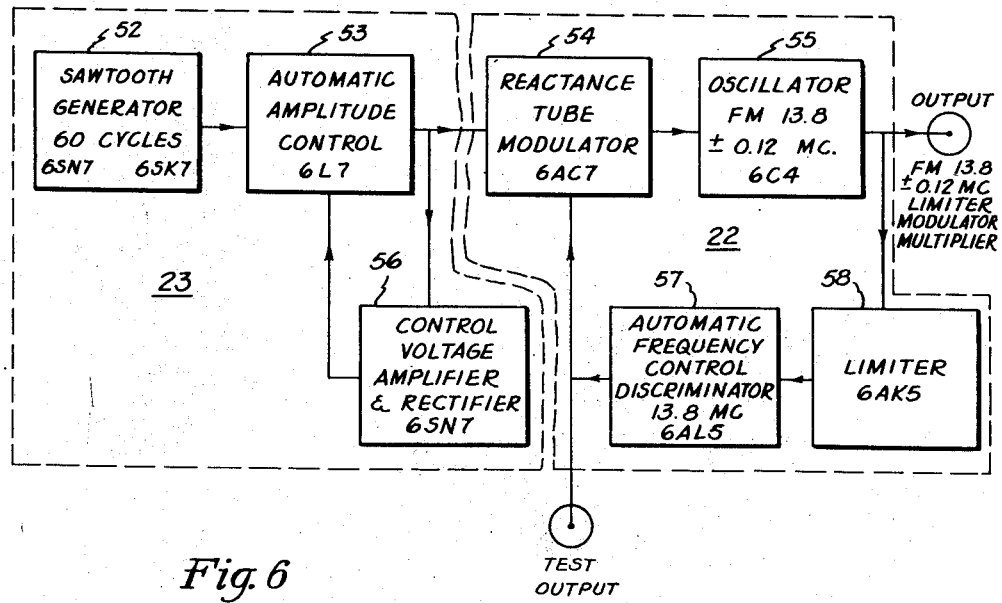
Fig. 6 is a more detailed block diagram of the frequency modulated oscillator and sawtooth generator of Fig. 3.

Fig. 6 shows more in detail the frequency modulated oscillator 22 and the sawtooth generator 23. The output of a linear sawtooth voltage generator 52 operating at a repetition frequency of 60 cycles is passed through an automatic amplitude control circuit 53 to a reactance tube modulator 54. A branch line at the input to the modulator 54 feeds the sawtooth voltage to the rectifier and control voltage generator 56. The output voltage of component 56 is applied to the amplitude control 53 and controls the gain of component 53 so as to maintain a sawtooth voltage of constant peak amplitude at the input to the reactance tube 54. The reactance tube 54 is connected to the oscillator 55 so as to vary the oscillator frequency in accordance with the amplitude of the voltage applied to the input of the reactance tube 54. Since the voltage input to the reactance tube varies linearly with time so does the instantaneous frequency of the oscillator 55. The peak amplitude of the sawtooth voltage input to the reactance tube is adjusted to produce the desired amount of frequency modulation on the oscillator 55.

The center frequency of the oscillator is maintained constant by an automatic frequency control circuit. Some of the output from the oscillator 55 is passed through a limiter 58 to remove all amplitude modulation from the signal into a frequency discriminator circuit 57 which generates a control voltage that is applied into the reactance tube modulator 54 so as to maintain the center frequency of oscillator 55 at the proper value.

Figure 7:
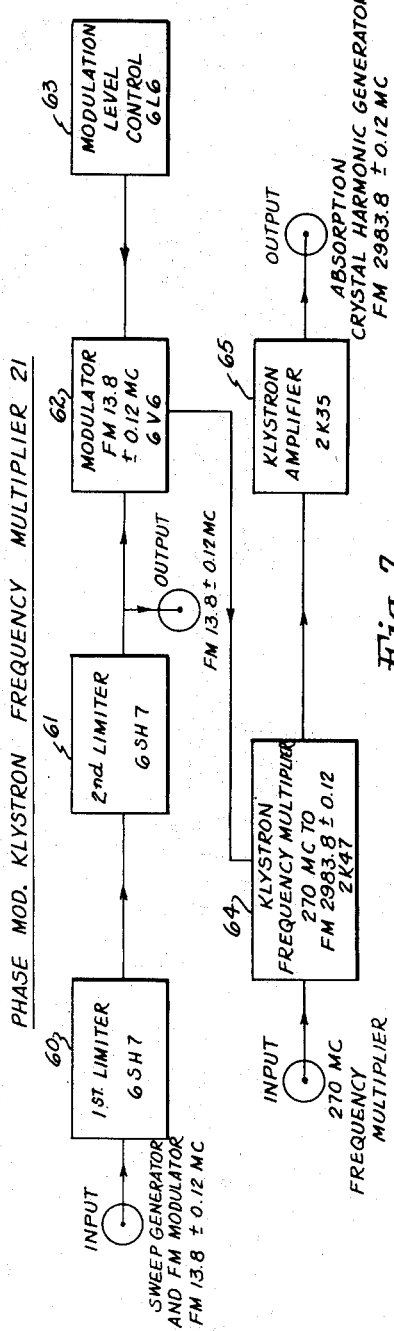
Fig. 7 is a more detailed block diagram of the phase modulated klystron frequency multiplier of Fig. 3.

Fig. 7 shows more in detail the construction of the phase modulated klystron multiplier 21. The frequency moludated output (13.8±0.12 megacycles) from frequency modulated oscillator 22 is applied through first limiter 60 and second limiter 61 (not shown in Fig. 3). The output of the second limiter (13.8±0.12 megacycles) is applied to mixer 28 and is also applied to modulator 62 which is controlled by modulation level control 63. The output of modulator 62 is applied to klystron frequency multiplier 64 to which is also applied the 270 megacycle frequency from multiplier chain 20. The output of the klystron multiplier 64 is applied through klystron amplifier 65 to the crystal harmonic generator associated with the absorption cell 25.

Figure 8:
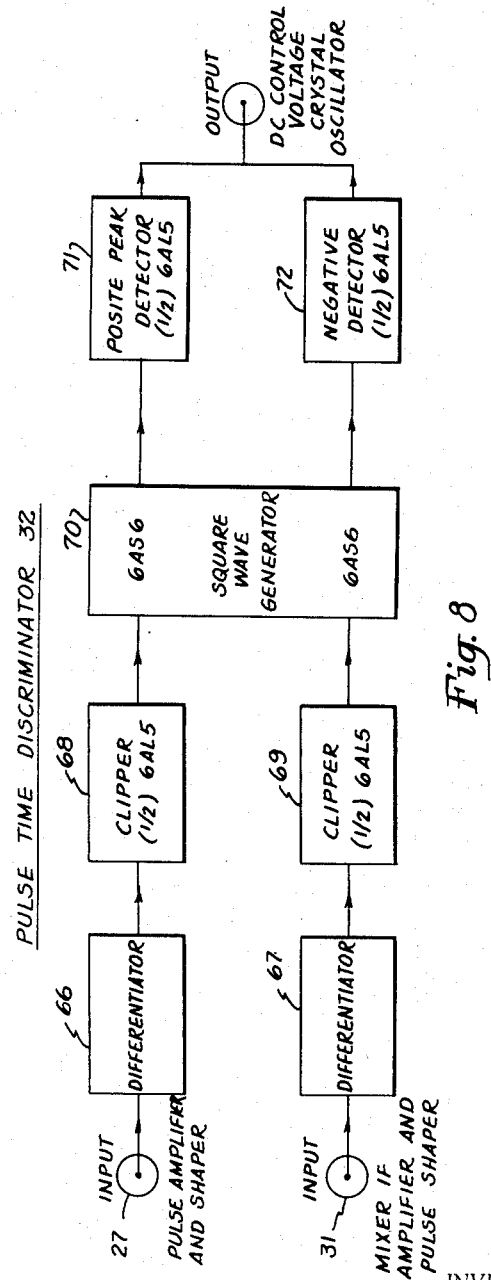
Fig. 8 is a more detailed block diagram of the pulse time discriminator shown in Fig. 3.

Fig. 8 shows more in detail the pulse time discriminator 32. One input to the discriminator 32 is derived from the pulse shaper 27 which provides a pulse at the time when the frequency modulated wave applied to the absorption cell 25 sweeps through the absorption frequency of the ammonia molecules. This input is further shaped by differentiator 66 and clipper 68 and applied to square wave generator 70 which is essentially a flip-flop circuit. The other input to the pulse discriminator 32 comes from the amplifier and pulse shaper 31 which produces a pulse when the frequency modulated wave produced by the mixer 28 sweeps through the resonant frequency of circuit 29. This latter input from component 31 is also further shaped by differentiator 67 and clipper 69 and applied to square wave generator 70. Square wave generator 70 is placed in one condition by a pulse from clipper 68 to produce a continuing pulse of one polarity. It produces this pulse until it is placed in its other condition by a pulse from clipper 69 at which time it produces a pulse of opposite polarity until again tripped by a pulse from clipper 68. The square wave thus produced by square wave generator 70 has alternate pulses of opposite polarity and of equal duration if the pulses produced by clippers 68 and 69, respectively, follow each other at equal intervals. If the interval between the pulses supplied by clippers 68 and 69 changes, then the square wave produced by generator 70 will no longer have positive pulses equal to its negative pulses.

The square wave produced by generator 70 is applied to positive peak detector 71 and also to negative peak detector 72 which are connected in parallel to produce a combined output voltage. When the time interval between the input pulses supplied to differentiators 66 and 67 is correct the on-off cycle of square wave generator 70 generates no output signal from the positive and negative peak detectors driven by the square wave signal. The detectors draw current on the positive and negative peaks of the square wave but when the positive and negative pulses of the square wave are of equal duration they balance and give no D. C. output. However, if the time interval between the two input driving pulses gets longer or shorter the relative duration of the positive and negative parts of the square wave changes so that a resultant D. C. output is generated. No error voltage is generated when the quartz crystal oscillator is on the proper frequency to tune the frequency multiplying chain 20, 21 and 25 to the ammonia absorption line, but a control voltage is produced to retune the oscillator if it is tending to drift.

Figure 9:
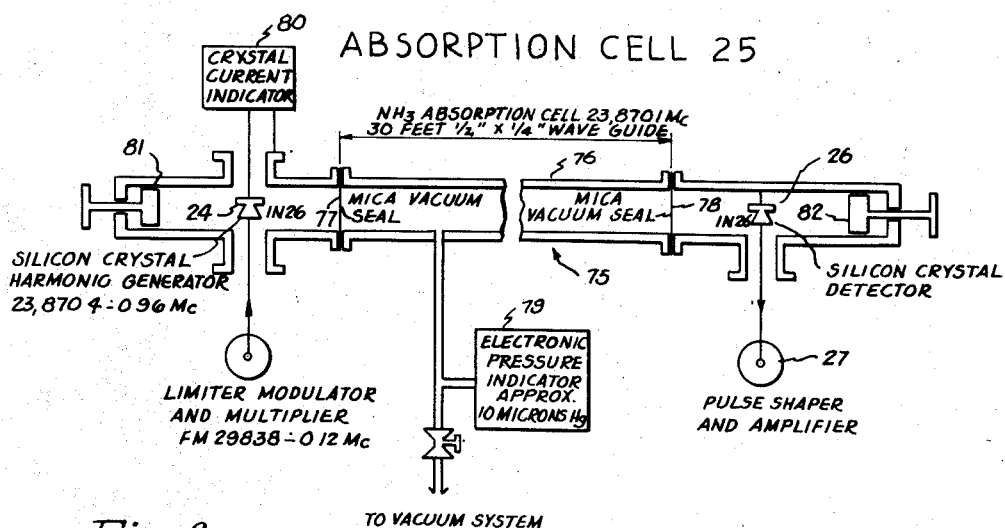
Fig. 9 is a sectional view, partly schematic, of the absorption cell and associated components shown in Fig. 3.

Fig. 9 shows more in detail the construction of the absorption cell 25. The absorption cell may consist of a waveguide 75 of which the central section 76 is separated from the two ends by vacuum seals 77 and 78 which are impervious to gas but allow the radio frequency energy to pass unimpeded. The central portion 76 encloses ammonia gas at a reduced pressure. In practice, a length of the ammonia-filled central section of the waveguide, thirty feet long and one-half by one-fourth inch in section, filled with ammonia gas at approximately 10 microns of a mercury pressure has been found to be satisfactory. An electric pressure indicator 79 is provided for indicating the gas pressure. One end of the absorption cell waveguide is provided with a branch opening through which energy from the klystron frequency multiplier 21 is applied to the crystal harmonic generator 24 which generates an eighth harmonic of the applied frequency and transmits it through the ammonia-filled section of guide 76. A crystal current indicator 80 is connected with the silicon crystal harmonic generator 25. At the receiving end of the absorption cell waveguide a silicon crystal detector 26 is provided, which receives the energy transmitted through the ammonia-filled section 76 and supplies an output to the amplifier 27. Plungers 81 and 82 are shown at the input and output of the cell for impedance matching of the silicon crystals to the waveguide impedance. The rectifier silicon crystal 26 rectifies the incident radio frequency energy to produce output current which dips due to the absorption of energy as the input frequency sweeps across the absorption line frequency.

Alternatively a resonant cavity filled with ammonia gas may be used as the absorption cell in place of the waveguide described above.

Figure 10:
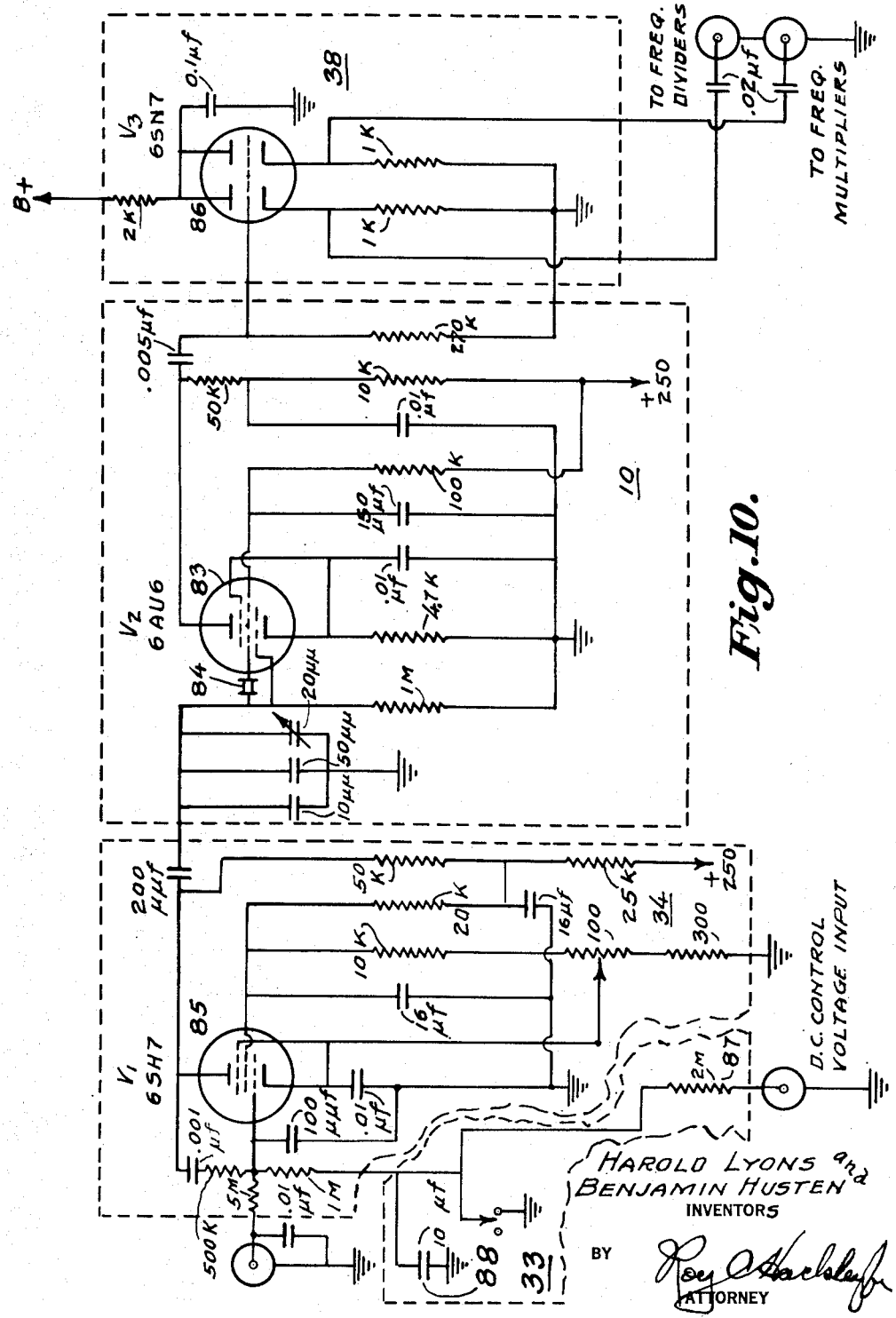
Fig. 10 is a schematic diagram of the 100 kilocycle quartz-crystal oscillator and reactance tube control circuit.

Fig. 10 shows more in detail the 100 kilocycle quartz crystal oscillator and associated circuits. Vacuum tube 83, quartz crystal 84 and the associated circuit constitute a crystal controlled oscillator. Vacuum tube 85 is a reactance tube which is connected across the circuit of the oscillator including vacuum tube 83 and crystal 84, and within narrow limits the reactance tube 85 controls the frequency of the oscillator. The effect of the reactance tube 85 upon the frequency of the oscillator is controlled by the error voltage applied from the discriminator 32 to the control grid of vacuum tube 85. Resistor 87 and condenser 88 constitute a low-pass filter which removes all short-time fluctuations from the control voltage before it is applied to the grid of tube 85. Vacuum tube 86 is a buffer amplifier between the oscillator and the frequency multipliers and frequency dividers.

Figure 11:
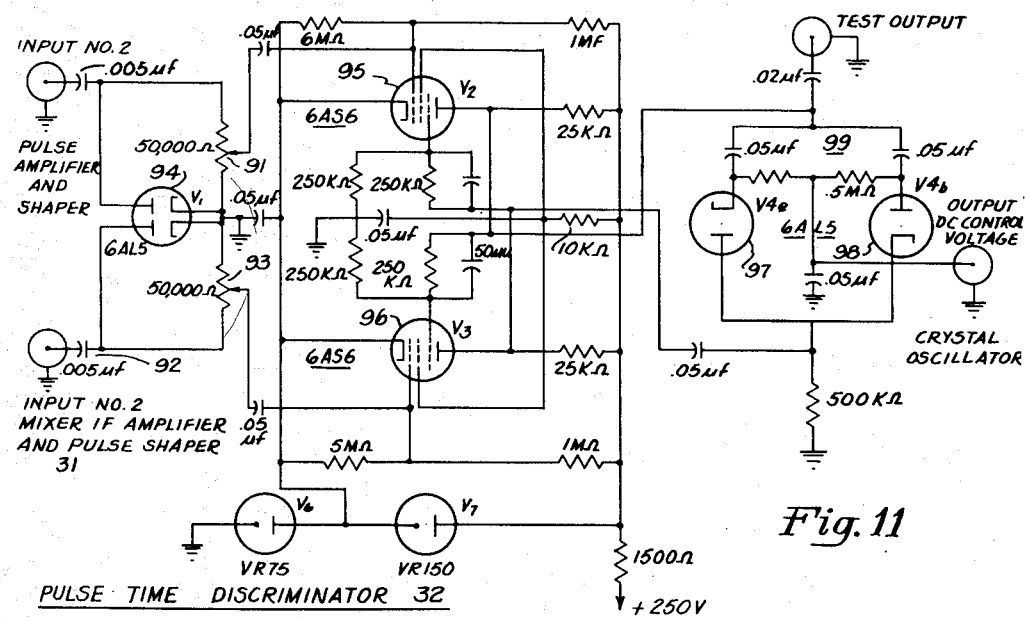
Fig. 11 is a schematic diagram of the pulse time discriminator.

Fig. 11 shows more in detail the pulse time discriminator. The input from the pulse amplifier and shaper 27 is differentiated by condenser 90 and resistor 91, clipped by one-half of double diode 94, and applied to the control grid of tube 95. Similarly the input from pulse shaper 31 is differentiated by condenser 92 and resistor 93, clipped by the other half of double diode 94, and applied to the control grid of tube 96. Tubes 95 and 96 with their associated circuits constitute a flip-flop circuit. A negative pulse applied to the control grid of tube 95 causes tube 95 to become non-conductive and tube 96 to be conductive and causes a positive pulse to be applied to the positive and negative peak detectors constituted by diodes 97 and 98. When a pulse is applied to the control grid of tube 96, tube 96 becomes non-conductive and tube 95 becomes conductive which applies a positive pulse to the opposite ends of diodes 97 and 98 constituting the positive and negative peak detectors. Circuit 99 is a smoothing circuit to provide a relatively smooth D. C. error voltage to control the frequency of the crystal oscillator.

Figure 12:
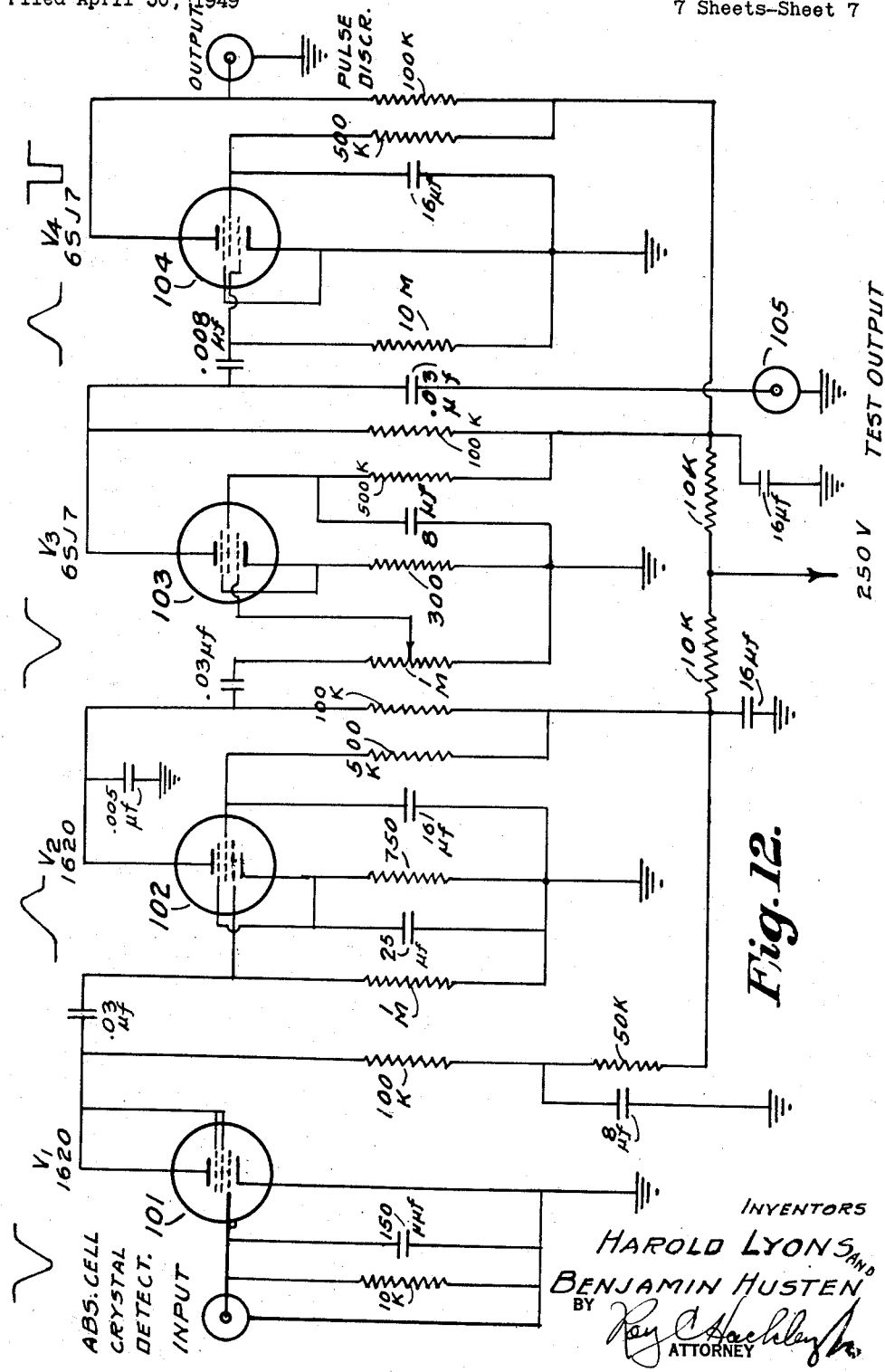
Fig. 12 is a schematic diagram of the pulse amplifier and pulse shaper.

Fig. 12 shows more in detail the pulse amplifier and shaper 27. The output of the crystal detector 26 is fed into the grid of tube 101 and the output of tube 101 is further amplified in tubes 102 and 103. Tube 104 is a pentode amplifier-clipper tube which is overdriven by the pulse from tube 103 so as to produce a narrow flat top output pulse. A test output 105 is provided in order to continuously monitor the pulse obtained from the absorption of energy by the ammonia molecule.

The limitations and problems involved in the use of spectrum lines requires a discussion of the properties of atoms and molecules as actually used in beams and absorption cells. Microwave lines can be measured with great precision. Proper design for ultimate accuracy requires quantitative consideration of the factors determining the width of the lines and the noise figure of the detection equipment. Of the many types of spectral transitions giving rise to lines, all those depending materially on external fields have been discarded. The absorption lines of ammonia have been used in the example of the atomic clock because ammonia has the strongest lines yet measured in the 24,000 mc. range in which it is advantageous to work.

The following is a table of various frequency standards compared on the basis of Q or relative bandwidth factors.

about a mean value depending on the temperature. Therefore, the line width can be reduced by lowering the temperature of the gas (or using a heavier molecule) but not much can be gained in this way since the improvement is so slow as shown by the formula for "Doppler effect" given in the above Q table. The Q of the ammonia line due to Doppler broadening will be about 330,000 at room temperatures.

The collisions between molecules and other molecules and the walls of the absorption cell also broaden the absorption lines. This effect occurs because the collisions abruptly terminate the absorption process, causing the

Q or relative bandwidth of various frequency standards

In the following table $L$ = mean free path, $|\mu|$ = dipole moment matrix, $M$ = molecular weight, $A$ = wall area, $V$ = volume, $T$ = temperature, $l$ = transition length, $h$ = Planck's constant, $\nu$ = molecular velocity, $c$ = velocity of light.

| Description of Standard or Cause of Line Broadening | Relative Line Width Total Width of Line at Half-Intensity | Q | Remarks |
|---|---|---|---|
| Natural line breadth due to spontaneous emission. | $\frac{\Delta\nu}{\nu} = \frac{64\pi^3}{3hc^3} \cdot \nu^2 \|\mu_{mn}\|^2$ | $\sim 10^{18}$ | For $NH_3$. |
| Natural line breadth due to stimulated emission and absorption. | $\frac{\Delta\nu}{\nu} = \frac{64\pi^3}{3h^2c^2} \cdot kT \|\mu_{mn}\|^2$ | $\sim 10^{16}$ | For $NH_3$. |
| Interruption of inversion by a transition to another rotational level. | Sum of line widths due to spontaneous and simulated emission and absorption between rotational levels. | $\sim 10^{10}$ | For $NH_3$ (3,3) line. |
| Collisions of molecules with walls of container. | $\frac{\Delta\nu}{\nu} \sim \frac{l}{\nu} \frac{A}{V} \sqrt{\frac{8RT}{\pi M}}$ | $\sim 10^6$ | Bleaney and Penrose cavity method. |
| Doppler effect | $\frac{\Delta\nu}{\nu} = \frac{2}{c}\sqrt{\frac{2RT}{M} \cdot \log_e 2}$ | $3 \times 10^5$ | $NH_3$ at room temperature. |
| Self-broadening due to collisions | $\frac{\Delta\nu}{\nu} = \frac{l}{\nu} \frac{l}{L\pi}\sqrt{\frac{8RT}{\pi M}} \sim$ pressure | $\sim \frac{5 \times 10^2}{P_{mn}}$ | $NH_3$ from Bleaney and Penrose data. |
| Saturation due to disturbance of thermal equilibrium. | Increases with incident power. | $\sim 10^6$ | Bleaney and Penrose estimate. |
| Pendulum | Depends on design | $10^4$ to $10^5$ | Good gravity pendulum. |
| Tuning fork | Depends on design | About $10^4$ | Good fork in vacuum. |
| Cavity resonator | Depends on mode and conductivity of cavity. | $10^4$ to $10^5$ | Ordinary cavities. |
| Quartz crystal resonator | | $10^6$ to $5 \times 10^6$ | |
| Atomic Beams $\begin{cases} \text{Cesium} \sim 9,200 \text{ Mc.} \\ \text{Thallium} \sim 30,000 \text{ Mc.} \end{cases}$ | $\frac{\Delta\nu}{\nu} \cong \frac{1.3\sqrt{\frac{2RT}{M}}}{l\nu}$ | $10^7$ to $3 \times 10^7$ <br> $3 \times 10^7$ to $9 \times 10^7$ | P. Kusch Depends on mode of excitation. Q for $l$ equals 50 cm. |

As in radio technique, the Q of a spectrum line is defined as the center frequency of its resonance curve divided by the half-width of the curve $f_0/\Delta f$ or $\nu_0/\Delta\nu$. Here the resonance curve is the plot of the power transmitted through an absorption cell containing the gas as a function of frequency of the incident radiation. The half-width is the width of the curve at the half-power points. The Q of the spectrum lines selected is compared to that of other frequency standards in the table. Logarithmic decrements, $\delta$, of the standards can be obtained from the relation $Q\delta = \pi$. It is seen that ammonia has a Q less than that of the best quartz-crystal but much more stable. The atomic beam method yields unprecedently high Q values. Since Q is a measure of the sharpness of the line it determines the usefulness of the line as an accurate frequency and time standard. The finite width of spectrum lines means that atoms or molecules do not emit or absorb radiation at only one frequency but over a band of frequencies. In the case of ammonia, the natural line width as determined by the uncertainty principle of quantum mechanics or classically the radiation damping gives a Q of about $10^{18}$. However, the line is broadened by other factors, which lower the Q to a value of from 50,000 to 300,000 depending on the temperature and pressure of the gas.

The ammonia molecules in the absorption cell are moving rapidly in a random way due to their thermal motion. Their average speed at room temperature is almost 2000 feet/second. This gives a broadening of the absorption line due to the Doppler effect as the incident electromagnetic wave travels down the waveguide absorption cell. If the molecule is receding or approaching from the wave because of its heat motion, it will absorb at a different frequency than if it were standing still. The heat motions are random and give speed distributed molecules to absorb wave trains of lengths which vary in a random way, determined by the random distribution of time intervals between collisions. A frequency analysis of these random wave trains shows a corresponding random distribution of frequencies absorbed, all centered about a mean value determined by the number of collisions per second. In ammonia gas at a pressure of 10 microns this will be about 120,000 per second giving an experimentally measured Q of 45,000 for the 3, 3 line. Actually there are more collisions which are effective in interrupting the absorption process in ammonia than the kinetic theory of gases would indicate. In other words, even near misses cause such strong interaction between the ammonia molecules as to interrupt absorption. In addition, there will be collisions with the walls which likewise broaden the line. The number of collisions per second and therefore the collision broadening can be reduced by lowering gas pressure. This does not, fortunately, reduce the amount of absorption in the gas, because the reduction in the pressure or number of molecules absorbing energy is offset by the increase in absorption per molecule due to the increase in Q. However, this process finally breaks down when a phenomenon known as saturation of the line sets in. The saturation is caused by the amount of radiation being too great to handle when the pressure is reduced far enough resulting in a disturbance of thermal equilibrium in the gas.

In thermal equilibrium the population density of the various energy states of the molecules is determined by the Maxwell-Boltzmann distribution law. Excessive absorption disturbs this equilibrium distribution. Too few molecules in the proper states are left to absorb the radiation or wave coming into the absorption cell. Too many molecules, which normally are in the proper energy level to absorb the incoming radiation, are in an excited energy level due to previous absorption of a quantum of radiation. Eventually the molecule will spontaneously emit, or be stimulated by the incoming radiation to emit, the quantum which it had absorbed and so will return to its normal level where it can again absorb. However, this process is too slow as shown by the large value of Q, $10^{18}$, corresponding to the low probability for spontaneous emission and usually it returns to the ground level by means of a collision with another molecule. In this way the absorbed radiation is eventually converted into heat the actual absorption being the net difference between absorbing transitions and emitting transitions. In thermal equilibrium there are always more absorptions because the population density of the lower energy level is greater than the higher energy level. This is because the densities are proportional to $$l^{\frac{-h\nu}{kT}}$$

When the population densities are equalized by excessive incident radiation intensities no net absorption can take place.

It is now clear that if gas pressure is reduced enough to alleviate collision broadening, saturation broadening will set in due to a disturbance of the thermal equilibrium distribution of the molecules among the various energy levels. This effect can be alleviated by reducing the strength of the incoming radiation so that saturation of the line does not occur. However, as the gas pressure and radiation intensity are both lowered, a condition will finally be met for which the signal strength will be down in the natural, electrical noise level of the circuits used to detect the signal. This then sets the ultimate limitation on the reduction of collision and saturation broadening. It is estimated that a Q of 300,000 to 400,000 can be attained in this way at pressures of about 0.001 millimeter of mercury or one micron—still a long way from the Q due to the natural line width. If we assume that extreme Q values of 400,000 can be obtained with ammonia an accuracy of one part in 100 million or better should be possible since a measurement of the center of the absorption line to within $\frac{1}{250}$ of the width of the line should be possible. This is shown by similar experience with quartz crystals having Q values of this order. The above Q table shows the various factors governing the width of the ammonia lines and gives formulas for calculation of the widths.

More precise estimates of the maximum accuracy of absorption type clocks can be made involving the minimum change in signal which can be measured as the frequency would shift from the center of the absorption line. This minimum detectable shift in frequency would not be less if sharp lines are attained by lowering gas pressure. This is because the incident radiation intensity would have to be lowered to prevent saturation so that the output signal from the cell would be down in the noise level sooner. For a broader line, the change in output signal would not be as fast, as frequency is shifted, as for a sharp line. However, more power could be used before reaching saturation because the gas pressure would be higher. The same minimum shift in frequency could therefore be detected, giving the maximum accuracy for a condition just approaching saturation. Such considerations give a maximum accuracy of the order of one part in $10^8$ or better and depend somewhat on the particular gas and frequency used. Higher frequencies should improve performance if good detectors and strong enough signal sources are available.

An inspection of the above Q table therefore shows that heavy molecules at low temperatures would make the best standards. The absorption coefficients will go up as higher frequencies are used as will the Q due to collision broadening. The Doppler broadening, however, is independent of frequency and represents a severe limitation for the absorption method.

This development of an atomic clock has been carried to the point where a complete clock has been built and run with a constancy of better than one part in 20 million. This clock represents a basically new type of time and frequency standard independent of astronomical measurements.

It will be understood that the embodiment of this invention described above is exemplary only and that many changes and modifications thereof will occur to those skilled in the art within the scope of the appended claims.

What is claimed is:

1. A method of producing a precise standard frequency comprising the steps of producing a first electromagnetic wave of a certain frequency by a means having a high short-time stability means for producing a frequency-modulated wave, a frequency standard having a reaction at a certain frequency in its transmission of electromagnetic waves, means for applying to said frequency standard a combined wave whose frequency depends on frequencies of said first wave and said frequency modulated wave, producing a first pulse when the frequency of said combined wave passes through said reaction frequency, applying to a tuned circuit a combined wave whose frequency depends upon the frequencies of said first wave and said frequency modulated wave, producing a second pulse when the frequency of said last-mentioned combined wave passes through the frequency to which said circuit is tuned, adjusting said first frequency in dependence on the time interval between said first and second pulses, and means for applying said standard frequency to a utilization device.

2. A method of producing a relatively fixed frequency comprising the steps of producing a relatively low frequency, producing a frequency modulated wave, multiplying said relatively low frequency to produce a first multiplied frequency, and combining it with said frequency modulated wave to produce a first combined wave whose frequency depends on the frequencies of said first multiplied wave and said frequency modulated wave, applying said first combined wave to a frequency standard having a reaction at a certain frequency in its transmission of electromagnetic waves, producing a first pulse at the time when said first combined wave passes through said reaction frequency, multiplying said relatively low frequency to produce a second multiplied frequency, and combining it with said frequency modulated wave to produce a second combined wave, producing a second pulse when the frequency of said second combined wave sweeps through a certain frequency, adjusting said relatively low frequency in accordance with the interval between said first and second pulses.

3. A device for generating highly accurate timing pulses comprising an oscillator having high short-time stability for producing a frequency, adjusting means for adjusting the frequency of said oscillator, means for producing a frequency modulated wave, an atomic system resonant at a certain frequency, means for applying to said atomic system a combined wave whose frequency depends on the frequencies of said oscillator and said frequency modulated wave, means for producing a first pulse when the frequency of said wave applied to said atomic system sweeps through the frequency of said resonant frequency, a circuit tuned to a certain frequency, means for applying to said tuned circuit a combined wave whose frequency depends on the frequencies of said oscillator and said frequency modulated wave to produce a second pulse when the frequency of said last-mentioned combined wave sweeps through the frequency to which said network is tuned, means responsive to the interval between pulses to produce an error signal, means to apply said error signal to said adjusting means, means responsive to the output of said oscillator to produce a constant low-frequency signal, and means for integrating the low-frequency signal.

4. In combination, an oscillator for producing a frequency, means for adjusting said oscillator, means for multiplying said frequency to produce first and second multiplied frequencies, means for producing a frequency modulated wave, means for combining said frequency modulated wave with said first multiplied frequency to produce a first combined wave whose frequency depends on the frequencies of said oscillator and said frequency modulated wave, a frequency standard having an absorption characteristic, means for applying said first combined wave to said standard, means for producing a pulse at the frequency at which said first combined wave is absorbed by said standard, means for combining said second multiplied frequency with said frequency modulated wave to produce a second combined wave whose frequency depends on the frequencies of said oscillator and said frequency modulated wave, a tuned network, means for applying said second combined wave to said tuned network to produce a pulse when said second combined wave sweeps through the frequency at which said network is tuned, means for producing an error signal in response to the spacing between said two pulses, means for applying said error signal to said adjusting means to maintain said oscillator at a constant frequency.

5. The combination of claim 4, in which the frequency standard is a wave guide filled with ammonia gas.

6. The combination of claim 4, in which the frequency standard is an absorption cell filled with a suitable absorbing gas.

7. The combination of claim 4, in which the frequency standard is a resonant cavity filled with a suitable absorbing gas.

8. The combination of claim 4, in which the means for producing an error signal includes a flip-flop circuit which produces a voltage of one polarity upon application of said first pulse and a voltage of the opposite polarity in response to said second pulse, thereby to produce a square wave the duration of the positive and negative peaks of which are indicative of the intervals between said first and second pulses, detecting means to produce a D. C. voltage indicative of the interval between said first and second pulses, and means for applying said square wave to said detecting means.

References Cited in the file of this patent

UNITED STATES PATENTS

| | | |
|---|---|---|
| 1,514,751 | Wold | Nov. 11, 1924 |
| 1,928,794 | Poole | Oct. 3, 1933 |
| 2,301,197 | Bradford | Nov. 10, 1942 |
| 2,404,568 | Dow | July 23, 1946 |
| 2,406,125 | Ziegler et al. | Aug. 20, 1946 |
| 2,457,673 | Hershberger | Dec. 28, 1948 |
| 2,475,074 | Bradley et al. | July 5, 1949 |
| 2,521,700 | Dodington | Sept. 12, 1950 |
| 2,555,131 | Hershberger | May 29, 1951 |
| 2,559,719 | Hershberger | July 10, 1951 |
| 2,584,608 | Norton | Feb. 5, 1952 |
| 2,591,257 | Hershberger | Apr. 1, 1952 |
| 2,609,654 | Hershberger | Sept. 9, 1952 |